(12) United States Patent
Srinivas et al.

(10) Patent No.: US 7,747,653 B2
(45) Date of Patent: Jun. 29, 2010

(54) SUMMARIZING APPLICATION PERFORMANCE IN A LARGE SYSTEM FROM A COMPONENTS PERSPECTIVE

(75) Inventors: Kavitha Srinivas, Rye, NY (US); Harini Srinivasan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/449,126

(22) Filed: Jun. 8, 2006

(65) Prior Publication Data

US 2007/0074189 A1 Mar. 29, 2007

Related U.S. Application Data

(60) Provisional application No. 60/711,767, filed on Aug. 26, 2005.

(51) Int. Cl.
*G06F 7/00* (2006.01)
(52) U.S. Cl. ........................................ 707/797; 717/133
(58) Field of Classification Search ........................ None
See application file for complete search history.

(56) References Cited

U.S. PATENT DOCUMENTS

| | | | | |
|---|---|---|---|---|
| 6,751,789 | B1 * | 6/2004 | Berry et al. | 717/130 |
| 7,289,947 | B2 * | 10/2007 | Ammons | 703/22 |
| 2003/0140282 | A1 * | 7/2003 | Kaler et al. | 714/39 |
| 2004/0025088 | A1 * | 2/2004 | Avvari et al. | 714/38 |
| 2004/0168156 | A1 * | 8/2004 | Hundt et al. | 717/130 |
| 2005/0183070 | A1 * | 8/2005 | Alexander et al. | 717/133 |
| 2005/0283765 | A1 * | 12/2005 | Warren et al. | 717/131 |
| 2006/0242636 | A1 * | 10/2006 | Chilimbi et al. | 717/158 |
| 2006/0248401 | A1 * | 11/2006 | Carroll et al. | 714/38 |

OTHER PUBLICATIONS

Jinsight 2.1 reference manual, http://www.research.ibm.com/jinsight/docs/ cached by www.archive.org on Mar. 2004.*
Glenn Ammons et al., "Finding and Removing Performance Bottlenecks in Large Systems", ECOOP, Jun. 14-18, 2004, LNCS 3086, pp. 172-196.*
Srinivas, K. and Srinivasan, H., "Summarizing Application Performance from a Component Perspective", ESEC-FSE, Sep. 5-9, 2005, p. 136-145.*

(Continued)

*Primary Examiner*—Neveen Abel Jalil
*Assistant Examiner*—Vei-Chung Liang
(74) *Attorney, Agent, or Firm*—Michael J. Buchenhorner; Vazken Alexanian

(57) ABSTRACT

A process of analyzing performance of a computer program including a plurality of components includes steps of: receiving a call tree profile having a plurality of nodes, each node representing an invocation and each node being annotated with a cumulative performance cost for the node; a set of one or more components of interest to a user; and a threshold level of a cumulative performance cost associated with invocations of methods of the component that constitutes an expensive method invocation; analyzing the call tree profile from leaf nodes, the analyzing step comprising selecting a set of one or more components of interest to a user and selecting only invocations that exceed the threshold level, and pruning the set of invocations that are not selected. Finally the process includes a step of presenting to the user a list of costs associated with the selected invocations.

12 Claims, 4 Drawing Sheets

OTHER PUBLICATIONS

Sevitsky, G. et al., "An Information Exploration Tool for Performance Analysis of Java Program", tools, p. 85-101, Technology of Object-Oriented Languages and Systems, Mar. 12-14, 2001.*

Hamou-Lhadj, A. and Lethbridge, T., "A Survey of trace exploration tools and techniques", Proceeings of the 2004 conference of the centre for Advanced Studies on Collaborative Research, Oct. 4-7, 2004, p. 42-55.*

Ball, T. et al., "Edge Profiling versus Path Profiling: The Showdown", POPL 98, Jan. 19-21, 1998, San Diego CA, p. 134-148.*

Alexander, W. P. et al., "A unifying approach to performance analysis in the java environment", IBM Systems Journal vol. 39, No. 1, 2000 p. 118-134.*

Ammons, G. et al., "Exploiting Hardware Performance Counters with Flow and Context Sensitive Profiling", PLDI '97, Jun. 16-18, 1997 Las Vegas NV, p. 85-96.*

Ball, T. et al., "Efficient Path Profiling", In Proceedings of the 29th Annual International Symposium on Microarchitecture, Dec. 2-4, 1996, p. 46-57.*

Ball, T. et al, "Analyzing Path Profiles with the Hot Path Browser", In Workshop on Profile and Feedback-Directed Compilation, 1998.*

Shende, S. et al., "Portable Profiling and Tracing for Parallel, Scientific Applications Using C++", Proceedings of the SIGMETRICS symposium on Parallel and distributed tools, Aug. 3-4, 1998, p. 134-145.*

* cited by examiner

SUMMARIZING APPLICATION PERFORMANCE IN A LARGE SYSTEM FROM A COMPONENTS PERSPECTIVE

CROSS-REFERENCE TO RELATED APPLICATIONS

This application claims the filing date of provisional application No. 60/711,767 filed on Aug. 26, 2005.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information technology and more particularly relates to the field of performance enhancing tools.

BACKGROUND OF THE INVENTION

In the era of distributed development, it is common for large applications to be assembled from multiple components that are developed by different development teams. As an example, an application such as ECLIPSE™ software has sixty different components (or "plug-ins") which are combined into a single large application. Some of these components are open-source third-party components such as ant; other components constitute the core application, but are built by separate teams. Similarly, for e-Business applications running on application servers, the application code is composed of several components, and it runs on top of middleware that is itself composed of multiple components. Because of the layering of components in these large applications, call stacks are deep (average stack depth: 27-75 in the applications we studied), the number of method invocations can be in millions (24000-35 million invocations in the applications we studied), and the total size of allocated bytes on the heap in these invocations can be large (89000 bytes-452 Mb in the applications we studied). In understanding and tuning the performance of such large systems, a critical need is tools that can provide a summarization of key performance problems by components of interest to the user.

Current approaches to this problem include summarizing by base costs and cumulative costs for invocations, methods, packages or classes. Base cost reflects the cost of an invocation minus any costs of its callees. Cumulative costs reflect the cost of an invocation and its callees. Summarization by methods, classes or packages is at too coarse a level of granularity because the calling context is lost in these metrics, and calling context is critical for performance analysis. Summarization by invocations provides too much unnecessary data in which the user might not be interested. Examples of common code patterns that contain uninteresting invocations include:

The wrapper pattern: It is common for invocations to wrap or delegate to other functions that perform the actual work. Wrapper invocations are therefore uninteresting from a performance analysis standpoint. The only means to filter these out is to summarize invocations by base costs rather than cumulative costs, since wrapper invocations have low base costs, but high cumulative costs.

The tail-library pattern: It is common for application code to make many calls to library functions or middleware code, at the tail of a call sequence. These are functions that the user has little interest in performance tuning; so they are likely candidates for filtering. Yet, their costs cannot be entirely ignored. As an example, take the case where an application method foo( ) has numerous calls to HashMap.put which are cumulatively expensive. The cost of each HashMap.put call is insignificant in the base cost summary, as is the base cost of foo( ). Yet, from the application developer's perspective, it is often useful to understand that foo( ) has a large cumulative cost, because it often reflects poor application design, or inaccurate use of middleware or library functions. This understanding can be obtained by summaries of cumulative costs of foo( ). Note that here, we need a summary of cumulative costs rather than base costs, whereas we needed a base costs summary to handle the wrapper pattern.

The sandwiching pattern: It is common for applications to call middleware or library code, which then callback the application code within the same call sequence. As an example, foo( ) may call some EJB (ENTERPRISE JAVABEANS™ program) container functions c1( ) and c2( ), which then callback the application function bar( ). Using cumulative costs alone for identifying expensive invocations is inadequate because of double counting (e.g., foo's costs include those of bar in this measure). Using base costs would miss the costs of calls to the middleware functions c1 and c2 for reasons described in the previous paragraph.

Therefore there is a need for a method and tool for summarizing application performance that overcomes the above shortcomings.

SUMMARY OF THE INVENTION

A process and tool comprises as a first input a call tree profile, where each node represents an invocation and each node is annotated with cumulative performance costs (e.g., allocated bytes, machine instructions, and cycles) associated with that node. A second input is a subset of components that are of interest to the user. This is used to filter out components that the user has no interest in, from a performance tuning perspective. A third input to the system is a threshold which specifies what cumulative percentage value constitutes an "expensive" method invocation. The tool then walks up the call tree profile from the leaf nodes, and computes the set of expensive invocations using a combination of filtering and thresholding. In comparing the cost of each invocation to the threshold value, there is computed a segmented cumulative cost for the invocation, where the cost includes the rolled up costs of its callees that were deemed uninteresting minus the cost of callees that were deemed interesting.

The segmented cumulative cost measure allows elimination of wrapper functions if they call other application functions that perform most of the work. The filtering mechanism is designed specifically to handle tail library calls, because it filters out calls to uninteresting components. Finally, segmented cumulative cost handles sandwiched calls by avoiding double counting, A secondary advantage of summarization of performance problems by components is that it helps in assigning blame to specific components based on the expensive invocations within the component. This type of component-based summary of performance is especially useful in identifying serious performance differences between two versions of the same application. Two versions of the same application rarely have similarity at the level of invocations, methods, classes, or packages. Yet by defining a higher level abstraction on these programming elements, it makes comparison across different versions possible.

DESCRIPTION OF THE PREFERRED EMBODIMENT

Figure 1:
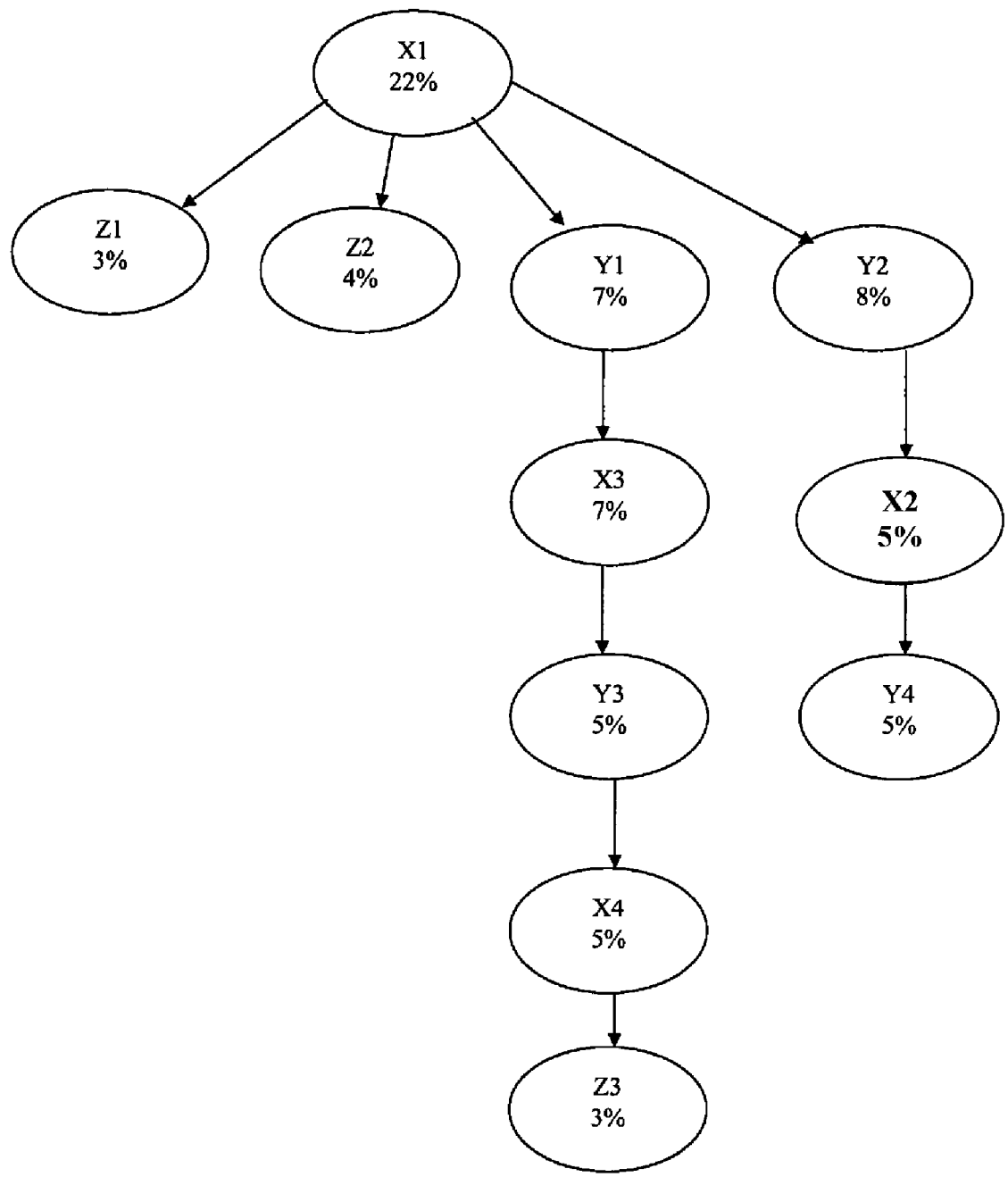
FIG. 1 is an illustration of a call tree with annotated cumulative percentage costs, according to an embodiment of the invention.

Referring to FIG. 1, there is shown a very simple call subtree with nodes annotated with cumulative percentage costs. The cost can be number of instructions, number of invocations, number of cycles, number of objects, number of allocated bytes, and so forth. In FIG. 1, method calls Y1, Y2, Y3, and Y4 correspond to calls in component Y, which is a third party (vendor) component, method calls X1, X2, X3, and X4 correspond to calls in component X, the application code. Method calls Z1, Z2, and Z3 are calls in J2SE (Java 2 Platform, Standard Edition code, labeled component Z, in FIG. 1. Table 1 summarizes the percentage base cost for each of the invocations in FIG. 1. We associate a value of zero when the percentage base cost was very negligible. Suppose we are only interested in reporting invocations with cumulative costs that are greater than or equal to a threshold value of 5% in the component of interest to the user (component X). In this case, a traditional tool which summarizes invocations by their cumulative costs will report the interesting set of invocations to the user as X1, X2, X3, and X4. A tool that reports costs with respect to base costs of each method will report that none of the components in component X reached threshold. TABLE-US-00001 TABLE 1 Percentage Base Cost of Invocations. Invocation Percentage Base Cost X1 0 X2 1 X3 2 X4 0 Y1 0 Y2 2 Y3 0 Y4 5 Z1 3 Z2 4 Z3 5.

TABLE 1

Percentage Base Cost of Invocations.

| Invocation | Percentage Base Cost |
|---|---|
| x1 | 0 |
| x2 | 1 |
| x3 | 2 |
| x4 | 0 |
| y1 | 0 |
| y2 | 2 |
| y3 | 0 |
| y4 | 5 |
| z1 | 3 |
| z2 | 4 |
| z3 | 5 |

From the user's perspective though, the user needs to understand that X2 and X4 were expensive methods because they are tail-library calls. That is, X2 and X4 were expensive because they perhaps used the API of the vendor or J2SE code incorrectly or because some aspect of their design requires unnecessary calls to the vendor or J2SE code. We first present a method according to an embodiment of the invention for identifying performance hotspots. Then we examine the utility of this summarization for blame assignment and for understanding performance differences between versions of seven applications.

As noted above, assuming that we have as input a call tree profile with nodes (representing invocations) that are annotated with the cumulative performance costs of each node. The first step of the method is to color the nodes in the call tree that are of interest to the user in terms of component definition and threshold value. Specifically, for any given component X, we define a component bucket CB which is the set of all invocations n that belong to component X, where the cumulative cost of the invocation exceeds the threshold value. See Threshold equation (1).

At this point, in terms of the example provided in FIG. 1, we have isolated our set of nodes in CB(X) to be X1, X2, X3, and X4. We refer to these nodes as being "colored" and the set of all colored nodes in the call tree across all user-defined component buckets as ColoredNodes. This set of ColoredNodes provides a coarse approximation of the results of thresholding and filtering. ColoredNodes at this point handles tail library patterns, but not wrapper patterns or sandwiching patterns.

Our next step is to eliminate the double counting problem induced by wrapper or sandwiching patterns. We iteratively identify the "colored leaf" nodes in the call tree. Specifically, we find colored nodes in this tree whose descendants do not belong to the set of colored nodes in any of the buckets of interest. A colored node, 1, is a colored leaf if 1 is either a leaf node of the call tree or 1 is not a leaf node and none of the descendants of 1 in the call tree are in the set of colored nodes (i.e., a tail library node). In either case, this node cannot be double counted. In FIG. 1, this step would identify x2 and x4 as colored leaf nodes in the first iteration, and they would be added to the ColoredLeafSet. We examine if the colored leaf node exceeds the user-defined threshold value and if it does, we add it to Hotspotset (i.e. the set of expensive method invocations). We also traverse the colored ancestor nodes of each of these colored leaf nodes computing a segmented cumulative cost or SegmentedCum for each of them. This step eliminates a colored node 1 from being double counted in any of its callers. SegmentedCum for a node n is the cumulative cost of an invocation n if it is a colored leaf node (see equation (2)), or it is the cumulative cost of invocation n after subtracting out the SegmentedCum of its successor nodes that are in the Hotspotset (equation (3)).

At this point in the method, in terms of the example provided in FIG. 1, because both X2 and X4 exceed Threshold, they are added to Hotspotset. Further, they each have a SegmentedCum value of 5%. because they are both colored leaf nodes. Node X3, an ancestor of X4, would have a SegmentedCum of 2% after Subtracting out the SegmentedCum of X4. Similarly, X1 will have a SegmentedCum of 12% after subtracting out the SegmentedCum of X2 and X4 which have SegmentedCum values of 5% each. At the end of this iteration, we remove X2 and X4 from ColoredNodes.

In the next (and last) iteration of finding the "colored leaves," we find only X3 as a colored leaf node, whose SegmentedCum is 2%. Since X3 fails to reach the user defined threshold value of 5%, the costs of X3 remain assigned to X1. At the end of this iteration, we remove X3 from ColoredNodes. The node X3 does not get added to Hotspotset because its SegmentedCum is less than Threshold. The final iteration looks at only X1, the root of the call tree, and identifies it as the colored leaf node. The SegmentedCum value of X1 is greater than Threshold (12%) and X1 gets added to Hotspotset. The final set of nodes in HotSpotSet are therefore deemed to be X1, X2, and X4 with SegmentedCum costs above threshold of 12%, 5% and 5% respectively.

The basic (or method) to compute SegmentedCum value for all nodes of interest is given below. The assumption is that the SegmentedCum value for each node has been initialized to its CumulativeCost.

$$CB(X) = \{n \in Invocations(X) \mid (cost(n) + \Sigma [\text{for all } i = succ(n)] cost(i)) \geq Threshold\} \quad (1)$$

$$SegmentedCum(n) = cost(n) + \Sigma[\text{for all } i = succ(n)] cost(i), n \in HotSpotSet \quad (2)$$

$$SegmentedCum(n) = cost(n) + \Sigma [\text{for all } i = succ(n)] cost(i) - \Sigma[\text{for all } i = succ(n) \in HotSpotSet] SegmentedCum(i) \quad (3)$$

```
while (!ColoredLeafSet.is empty()) {
  for (each node P in ColoredLeafSet such that SegmentedCum(P) ≥ Threshold) {
    HotSpotSet.add(P);
    ancestorSet = P.getAncestorSet {
      SegmentedCum(A) – SegmentedCum(A) – SegmentedCum(P);
    }
  }
  ColoredNodes.removableAllNodes.removeAllNodes(ColoredLeafSet);
  ColoredLeafSet.new + emptySet;
  Boolean hasColoredDescendantSet) {
  for {each node Q in descendant Set) (
    if(Q is in ColoredNodes) hasColoredDescendant + true;
  }
  If (!hasColoredNodes) ColoredLeafSet.new.add(P);
  }
  ColoredLeafSet – ColoredLeafSet.new;
}
```

The algorithm also assumes an initial ColoredLeafSet, computed as defined earlier. For each leaf node P in ColoredLeafSet of the call tree, we compute SegmentedCum of each of its ancestors (see equation (2)). Once the SegmentedCum values have been updated up the call chain for all ancestors of P, we compute a new leaf set, ColoredLeafSet-.new, i.e., the new colored leaves once we eliminate the processed nodes in ColoredLeafSet from ColoredNodes. We iterate again on this ColoredLeafSet.new, and terminate if (a) we have reached the top most ancestor, i.e., the root node of the call tree or, (b) all of the ancestors have a SegmentedCum less than the threshold value. Finally we report the cost per component ComponentCost of interest based on the component definition. For example, if the component is X the cost of all invocations in HotSpotSet which belong to X will contribute to X's cost.

As seen in the algorithm, the Threshold value is key to determining the Hotspotset. If the value of Threshold is small (or even 0%), we will end up with a lot more invocations in Hotspotset; however, the cost per component, ComponentCost will be more precise. Each hotspot invocation's cost is attributed to its own component and is not rolled into a different component For a larger value of Threshold, the number of reported invocations in Hotspotset is much Smaller; however ComponentCost will not be as precise. In particular, for larger values of Threshold, it is very likely that an invocation's cost is attributed to its parent and, hence to a different component. The 0% threshold case is useful for precise performance summary by component. The 5% threshold case is useful for summarizing the overall performance problems, and hence, provides starting points for performance tuning A question that can be raised is why not always use a Threshold value of 0% to get the best precision HotSpotSet and sort this set by cost to only consider the 'expensive' invocations. Empirical evidence suggests that this is not feasible. A 0% Threshold results in most of the invocations in the final Hotspotset having fairly low SegmentedCum cost. In this case, the method looks at all invocations and for each invocation, subtracts the contributions of all its descendants from the invocation's cost to compute SegmentedCum. There were very few (only 1 or 2) invocations in HotSpotSet that had SegmentedCum costs greater than 5%, and these invocations only for a small percentage of the overall performance cost (<10%). A better result can be obtained when using a threshold of 5% for segmentation. In this case, we summarized a set of 10-93 invocations that accounted for 82-99% of the overall performance costs.

Regression and Blame Assignment

Figure 2:
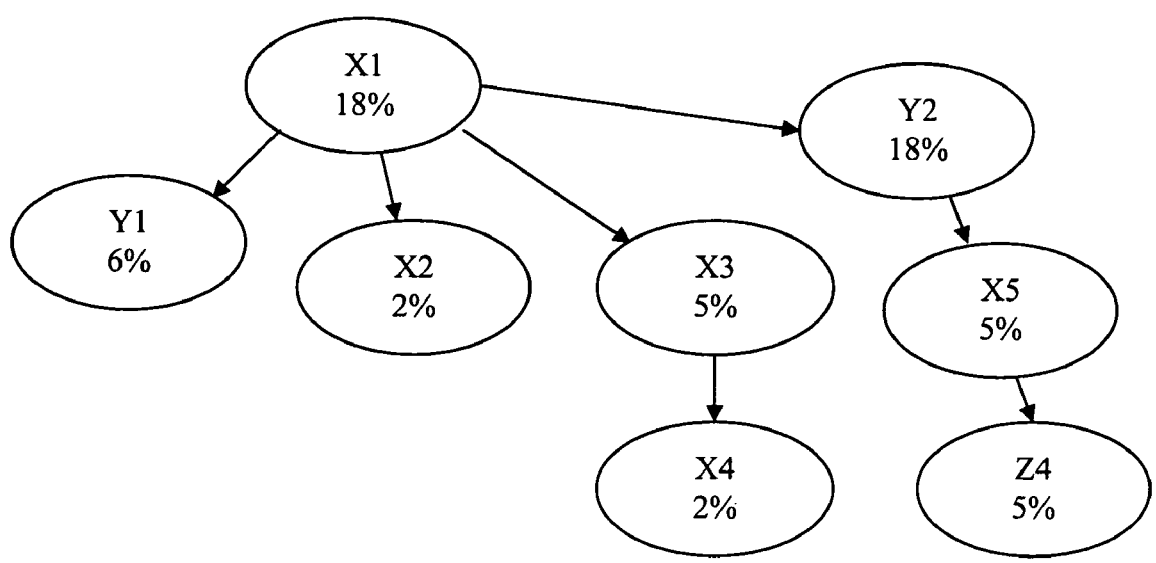
FIG. 2 shows a version of a call tree for an application A.
Figure 3:
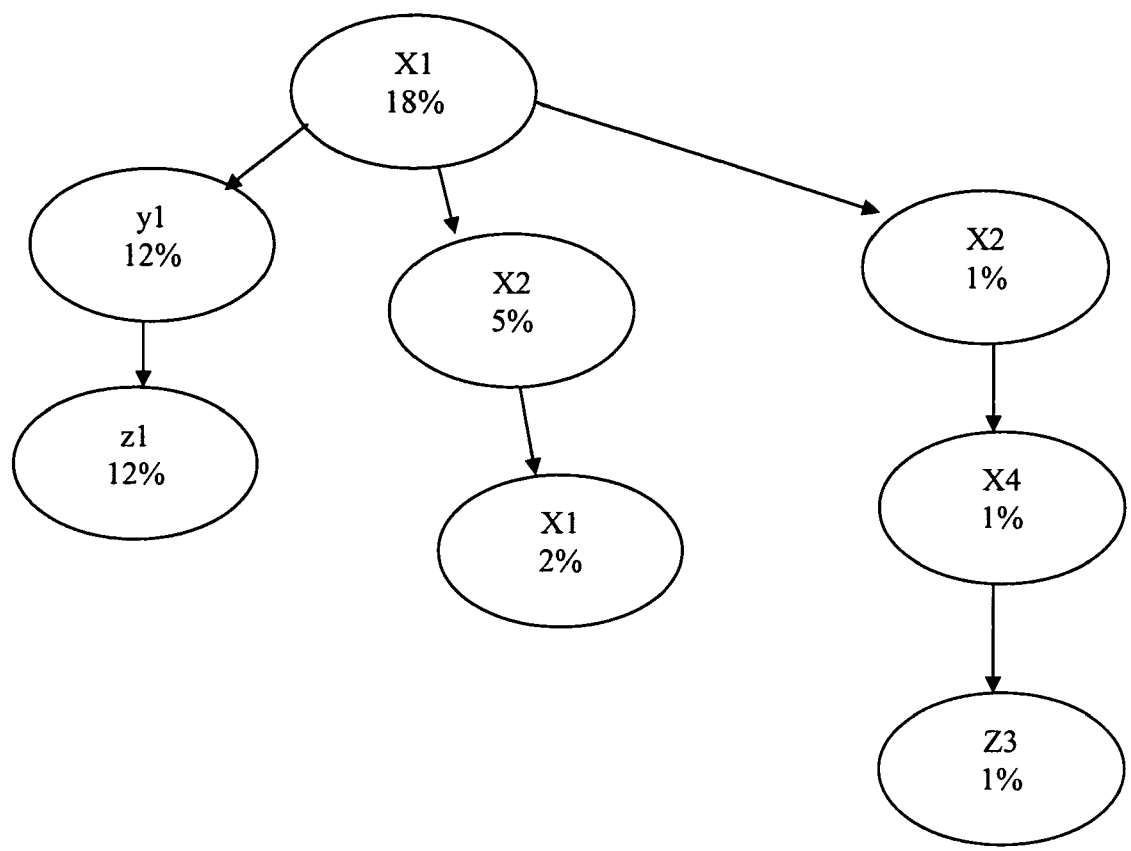
FIG. 3 shows a second version of a call tree for the application A.

Consider the implications of this method for comparisons between versions of an application, FIGS. 2 and 3 show the call trees for two different versions of the same application.

FIG. 2 shows version 1 of call tree for application A. In version 1, the hotspots in Components X and Y would be X3, X5, Y1, and Y2. The costs for components X and Y would be a cost of 10% for X, and a cost of 14% for Y. FIG. 3 shows a version 2 of call tree for Application A. In version 2, the hotspots in Components X and Y would be X2 and Y1. In version 2, the cost for Y at 12% is about the same as in version 1, but the cost for X has declined to 5%. This technique allows the user to examine costs at an individual component level, thus abstracting differences at the invocation level between versions.

We evaluated the utility of this methodology on two different types of applications: (a) server applications running on application servers, where the applications and the server are composed of multiple components, (b) client applications which are composed of several components. Table 2 shows some of the characteristics of the applications we chose to evaluate our methodology, along with A listing of their components. For the tool, we provided one or more package names that constituted each component. The last column indicates whether we tested performance across multiple versions of the application. Applications A1-A4 are implementations of the same exact functionality (a stock trading application), but were implemented with different subsets of components. Applications A1-A4 represents a factorial combination between different modes of data access (JDBC (JAVA™ Database Connectivity), EJB (enterprise JAVA™ Beans) and different modes of output to the client (JSP (JAVA™ server pages), SOAP (simple object access protocol)). Applications A5-A7 are Eclipse based client applications, with a well defined component architecture. In A5 and A6 (which were ECLIPSE™ 2.1.3 and 3.0 respectively), each component is defined in an external manifest file, as are its dependencies on other components. We used this definition to create a dependency graph for the component, and used the components specified in the dependency graph to segment performance for starting up the client application. We used the same technique to segment A7, which is a client application that was built on top of ECLIPSE™ 3.0. As shown in the tables 1 and 2, A7 has substantially more plugins than Eclipse 3.0. We used A7 to examine if selecting only a small set of components in the application for analysis still provides useful results. TABLE-US-00003 TABLE 2 Applications Studied and their Description Application Multiple Application Name Type Components Defined Versions A1 (JBDC, JSP) Server JSP, servlet, database, application Yes A2 (EJB, JSP) Server JSP, servlet, database, application, EJB Yes A3 (JBDC, web services) Server Servlet, database, application, SOAP Yes A4 (EJB, web services) Server Servlet, EJB, database, application, SOAP Yes A5 (Eclipse 2.1.3) Client 66 components, 4 components defined for Yes segmentation A6

(Eclipse 3.0) Client 60 components, 5 components defined for Yes segmentation A7 (Eclipse based Client 143 components, 5 components defined No application) for segmentation

TABLE 2

Applications Studied and their Description

| Application Name | Application Type | Components Defined | Multiple Versions |
|---|---|---|---|
| A1 (JBDC, JSP) | Server | JSP, servlet, database, application | Yes |
| A2 (EJB, JSP) | Server | JSP, servlet, database, application, EJB | Yes |
| A3 (JBDC, web services) | Server | Servlet, database, application, SOAP | Yes |
| A4 (EJB, web services) | Server | Servlet, EJB, database, application, SOAP | Yes |
| A5 (Eclipse 2.1.3) | Client | 66 components, 4 components defined for segmentation | Yes |
| A6 (Eclipse 3.0) | Client | 60 components, 5 components defined for segmentation | Yes |
| A7 (Eclipse based application) | Client | 143 components, 5 components defined for segmentation | No | server threads that serviced the web service requests, and the client thread that initiated the web service requests.

For applications A5-A7, we traced the startup of the application. A7 was an application based on Eclipse 3.0 (A6), but has about twice the number of components (or plugins). To make comparisons across A6 and A7 more easily, we used the same component definitions for Eclipse startup in segmenting performance for A7. This allowed us to compare the costs of scaling up the number of components in Eclipse. It also allowed us to examine how effective the technique was of limiting performance segmentation to a small number of "interesting components". In all 3 cases, we reported measurements for threads that had some activity in the components of interest. Table 3 shows basic characteristics of the applications we studied, with data about basic performance costs. In our experiments, we tested the results of component summarization with threshold values set at 0% and 5% respectively for each of the applications described above, to examine how the results change as a function of increasing threshold value. At 0% and 5% respectively for each of the applications described above, to examine how the results change as a function of increasing threshold value. At 0% threshold value, each method invocation is attributed to its Component, and no other component At 5% threshold value, a method invocation can be rolled into a different component

TABLE 3

Applications Characteristics and Basic Performance Costs

| Application | Max Call Stack Depth | Avg Call Stack Depth | # Invocations | # Instructions | # Allocated Bytes |
|---|---|---|---|---|---|
| A1 Version 1 | 82 | 39 | 28,747 | 5,649,271 | 333,280 |
| A1 Version 2 | 59 | 27 | 24,179 | 7,599,284 | 89,664 |
| A2 Version 1 | 81 | 42 | 59,784 | 11,097,934 | 453,664 |
| A2 Version 2 | 65 | 35 | 91,442 | 24,486,016 | 228,328 |
| A3 Version 1 | 90 | 39 | 65,452 | 19,195,330 | 539,768 |
| A3 Version 2 | 59 | 33 | 116,763 | 78,707,506 | 539,768 |
| A4 Version 1 | 89 | 45 | 97,107 | 20,316,607 | 627,568 |
| A4 Version 2 | 79 | 40 | 185,411 | 97,224,071 | 672,752 |
| A5 | 187 | 42 | 3,493,278 | 4,579,928,870 | N/A |
| A6 | 165 | 43 | 5,157,863 | 5,525,450,448 | 57,202,536 |
| A7 | 268 | 75 | 35,884,518 | 152,015,492,358 | 452,245,592 |

For A1-A4, we conducted a controlled experiment to collect the performance data for 2 versions of each of A1-A4. The versions differed both in application code and the underlying middleware. We traced a single transaction that fetched 10 stock quotes for a given user, after stress testing the application for 4000 transactions of the same type, The transaction was a read-only transaction, so stress testing the application did not alter the quantity of data that was retrieved from the database, thus allowing us to make controlled comparisons across A1-A4 for the 2 versions. Our traced execution was also chosen to be a cold cache scenario, so we could include the costs of fetching data from the database. In reporting our measurements, for A1-A4, we only report the results from the thread/threads that performed the transaction. However, for A3 and A4, which are web services applications, the overall transaction of fetching stock quotes was broken into a client thread that initiated the request for 10 stock quotes successively, and one or more server threads that serviced these 10 requests. For A3 and A4, our results are summed across the if its segmented cumulative value is less than the threshold value, and if its ancestor node's segmented cumulative value exceeds the threshold value.

Each approach of using different threshold values has its advantages and disadvantages. In the 0% case, each component is assigned only its value (or values of components irrelevant to the user), but this might result in many more method invocations that the user needs to evaluate. In the 5% case, the costs of a component can be rolled up into the cost of another component because it failed to reach threshold value, but this technique might isolate hotspots to fewer method invocations that the user needs to examine. We took an empirical approach to evaluating the utility of either approach.

Tables 4 and 5 provide the results from our tool on applications A1-A4, our server based applications. Segmented-Cum costs provided are in terms of number of instructions summed across expensive methods in the component, the total cumulative costs accounted by the tool across components, the number of instructions for the thread(s) performing the main transaction of interest, and the number of "interesting hotspot invocations" identified by the tool. Table 4 shows the results from our technique of segmentation with the 0% threshold value. Table 5 shows the same results with a 5% threshold value. Table 4 provides an accurate view of component contributions within the application while Table 5 highlights the most serious regressions and highlights the invocations responsible for them.

TABLE 4

Segmented cumulative costs of A1–A4 on 2 versions with 0% threshold value.

| Component | A1-1 | A1-2 | A2-1 | A2-2 | A3-1 | A3-2 | A4-1 | A4-2 |
|---|---|---|---|---|---|---|---|---|
| JSP | 622K | 1190K | 558K | 1460K | 512K | 1141K | 537K | 1149K |
| Servlet | 3806K | 2197K | 6820K | 3909K | 9682K | 18155K | 7798K | 19612K |
| Database | 974K | 3732K | 1076K | 3006K | 991K | 3730K | 1071K | 3030K |
| Application | 245K | 475K | 357K | 584K | 636K | 958K | 768K | 1491K |
| EJB | N/A | N/A | 2284K | 15525K | N/A | N/A | 2535K | 16742K |
| Web svcs | N/A | N/A | N/A | N/A | 7366K | 54634K | 7599K | 55176K |
| Total % | 99.9 | 99.9 | 99.9 | 99.9 | 99.9 | 99.9 | 99.9 | 99.9 |
| #Instructions | 5649K | 7599K | 11097K | 24486K | 19195K | 78707K | 20316K | 97224K |
| #Hotspot Invocations | 1120 | 2036 | 2153 | 4182 | 7594 | 29658 | 11791 | 36631 |

TABLE 5

Segmented cumulative costs of A1–A4 on 2 versions with 5% threshold value.

| Component | A1-1 | A1-2 | A2-1 | A2-2 | A3-1 | A3-2 | A4-1 | A4-2 |
|---|---|---|---|---|---|---|---|---|
| JSP | 910K | 1568K | 820K | 1835K | 790K | Below | 825K | Below Threshold |
| Servlet | 2873K | 1095K | 5803K | 1254K | 8238K | 7438K | 6517K | 8552K |
| Database | 298K | 2923K | Below | 1762K | 97K | 2014K | Below | Below Threshold |
| Application | 1389K | 1639K | 1396K | 3337K | 2907K | 4174K | 1763K | 5974K |
| EJB | N/A | N/A | 3002K | 15977K | N/A | N/A | 3099K | 14854K |
| Web svcs | N/A | N/A | N/A | N/A | 6930K | 62418K | 7779K | 64232K |
| Total % | 96.8 | 95 | 99.3 | 98.6 | 98.9 | 97 | 97 | 96 |
| #Instructions | 5649K | 7599K | 11097K | 24486K | 19195K | 78707K | 20316K | 97224K |
| #Hotspot Invocations | 11 | 12 | 12 | 14 | 56 | 57 | 62 | 56 |

As shown in Table 4, there was a factor of 1.3-4.7 regression between version 1 and version 2 for applications A1-A4, Broken down by components, the results were as follows: The JSP component in version 2 was 1.9-2.6 times worse than on version 1. The performance of the servlet component in version 2 for A1 and A2 was approximately 57% of the performance on version 1. We confirmed this with the development group of A1 and A2). The specific improvement in the servlet component for A1 and A2 was improvement in caching.

However, the servlet component for A3 and A4 was 1.8-2.5 times worse in version 2 than on version 1. On careful examination, we found that this was due to a bug that resulted in unnecessary logging. The database component in version 2 which replaced its corresponding component in version 1 was 2.7-3.8 times worse than in version 1. The application component was also 1.5-1.9 times worse in version 2. The EJB component was approximately 6.7 times worse in version 2 than in version 1. The web services component was approximately 7.3 times worse in version 2 than in version 1. The overall set of hotspot invocations was high in all cases, ranging from 1,120-36,631

Table 5 shows the results on the same applications using the 5% threshold value. For the JSP component, the regression of 1.7-2.2 occurred in At and A2, which is in the same range as that observed in Table 4. However, in A3 and A4, this regression was no longer visible because the component as a whole accounted for only 1-2% of the total performance in version 2.

The performance in the servlet component of A1 and A2 in version 2 was 38% better than the performance on version 1. However, there was negligible gain in performance in A3 across the two versions, and the performance of A4 on version 2 was 1.3 times that of version 1. The difference between the 5% threshold case and 0% threshold case occurred due to the roll up of logging costs into the EJB component.

The database regression in A1 was exaggerated to 9.8 times worse in version 2, and was not reliably above threshold in all other cases. Basically, database costs were rolled up to the callers more often in At, version 1 (because they were below the threshold value), but reached the threshold level of significance frequently enough in A1, version 2 to warrant the attribution of costs to the component.

Application costs in version 2 were 1.2-3.4 times the cost in version 1. The higher costs in this component are again due to roll up of servlet and EJB costs into this component. EJB regression cost was 4.8-5.3 times worse in version 2 than in version 1. Web services regression cost was 8.3-9.0 times worse in version 2 than in version 1. Not surprisingly, the number of "hotspot invocations" was low, ranging from 11-62.

To summarize, the use of a 5% threshold value identified most of the regressions identified using the 0% threshold value. It is clearly less precise than the 0% threshold in assigning blame to components, but using a higher threshold clearly helps prune the set of invocations that the user needs to examine to find performance problem. The striking fact about these regressions is that none of these regressions were obvious from simply examining call tree profiles of the two versions of the application. This is because the actual call trees are very different across versions making such comparisons difficult. Second, sandwiching effects make it impossible to determine which components have changed. In work with applications A1-A4, the regressions we identified were unknown to us and the development team; and these were later validated as performance bugs by the development team.

Table 6 shows the same information for 2 versions of Eclipse (versions 2.1.3 and 3.1.0). In Eclipse 2.1.3, class loading activities needed for starting up the IDE occurred through org.ectipsc.core.runtime code, which is in turn dependent on java.lang.ClassLoader. Eclipse 3.0 introduced a new runtime called org.eclipse.osgi which is involved in the class loading/startup process along with org.edipse.core.runtime, and java.lang.ClassLoader. We decided to examine the additional costs/benefits of adding the OSGI runtime in Eclipse 3.0, against Eclipse 2.1.3. As can be seen in Table 6, we found no real effect from adding a new runtime (OSGI) on loading and startup performance. In fact, performance costs for the 3 combined components of java.lang.ClassLoader, org.eclipse.core.runtime, and org.eclipse.osgi in Eclipse 3.0 was about 1.2 times that of the Eclipse 2.1 performance cost With respect to application A7, the number of classes to be loaded at startup is much higher resulting in total performance cost that was 23.8 times that of Eclipse 3.0. Interestingly, the number classes loaded during startup for Eclipse 2.1.3, Eclipse 3.0 and A7 were 1960, 2743 and 7737 respectively. The corresponding costs associated with components java.lang.ClassLoader, org.eclipse.core.runtime, and org.eclipse.osgi are also higher than in Eclipse 3.0. Note that although A7 has many more components, just choosing a handful (5 of 143 in this case) gives sufficient information about the application's startup performance.

As expected, the 0% threshold results in many more invocations in Hotspotset, while 5% threshold (Table 7) has far fewer invocations in Hotspotset. In addition, going from 0% to 5% does not hide the main components contributing to the startup costs—org.eclipse.core and org.eclipse.ui in Eclipse 2.1.3 and 'ui' costs in A7 are partly due to org.eclipse.ui and partly due to loading the ui classes via java.lang.ClassLoader. This is evident from the 0% threshold case which is more precise. In the 5% threshold case for A7, significant portion of the class loading overhead gets subsumed under org.eclipse.ui, which is reported as the component with most overhead.

TABLE 6

Segmentation of Eclipse 2.13, Eclipse 3.0 add A7 with 0% threshold value

| Component | Eclipse 2.1 | Eclipse 3.0 | A7 |
|---|---|---|---|
| org.eclipse.core | 1884087K | 708373K | 5019493K |
| java.lang.ClassLoader | 714598K | 1240557K | 67805066K |
| org.eclipse.osgi | Not Applicable | 1467054K | 14324793K |
| org.apache.xerces | 44116K | 125088K | 2051995K |
| org.eclipse.ui | 2069153K | 1897577K | 41464571K |
| Total % accounted for | 93.3 | 99 | 99 |
| #Instructions | 4759928K | 5524550K | 131740415K |
| #Hotspot Invocations | 148656 | 175841 | 318630 |

TABLE 7

Segmentation of Eclipse 2.1.3, Eclipse 3.0 and A7 with 5% Threshold Value

| Component | Eclipse 2.1 | Eclipse 3.0 | A7 |
|---|---|---|---|
| org.eclipse.core | 1186277K | 1231987K | 6698536K |
| java.lang.ClassLoader | Below threshold | 34520K | 4453587K |
| org.eclipse.osgi | Not Applicable | 628827K | 2428344K |
| org.apache.xerces | Below threshold | 88676K | Below threshold |
| org.eclipse.ui | 3288542K | 3382932K | 94398611K |
| Total % accounted for | 94 | 97 | 82 |
| #Instructions | 4759928K | 5525450K | 131740415k |
| #Hotspot Invocations | 30 | 93 | 82 |

A number of tools exist that provide call tree profiles and execute computations on these profiles such as recording the cost of an entire execution, interprocedural path information calling context trees, call path refinement etc. More recent work by Ammons et al addresses the issue of identifying bottlenecks in very large call tree profiles; in particular, it addresses summarizing execution-cost measurements and keeping track of overlap among bottlenecks. While all these call tree profiling schemes are valuable in pinpointing sources of problems in large applications, the technique presented in this specification views the problem from a completely different perspective. We summarize performance costs on a component basis, by analyzing call tree profiles for performance hotspot invocations in components of interest. In addition, we identify hotspots based on a user-defined threshold value. Our approach has two main goals: first, it allows assigning "performance" blame to individual components. As seen in our result tables, the use of a threshold value of even 5% dramatically reduces the number of invocations within a component that are responsible for the overall cost of the component. Second, with this approach we can identify differences in two versions of the same applications, again at the component level, even if the corresponding call sequences are different.

Another approach to the problem of identifying bottlenecks on a component basis is to compute a summary of costs (base costs) of invocations within individual components. Tools such as Jinsight allow the user to slice the execution profile based on component names. However, we still need the ability to use threshold to reduce the number of invocations reported within a specific component. Another key differentiating factor is that we retain context information in isolating invocations that are performance hotspots.

The approach described herein can be used to do a first level of performance analysis and use any of the above mentioned tools to drill down to do further analysis. Since the method operates on call tree profiles, any of the above mentioned tools that use call tree profiles can be easily extended to include the component segmentation method.

This technique is useful for obtaining a components-based breakdown of the performance of an application. As stated earlier in this specification, this is useful because software components tend to be developed by different teams of developers, which means that this type of performance breakdown is very useful for defining who should be responsible for fixing the problem.

A component level breakdown of the application also allows the comparison of multiple versions of the same application, to see if a newer version introduces any performance regressions. Typically, this is hard to do, except at the coarsest level of granularity (all one can say is the version 2 seems worse than version 1). The problem is that often, a newer version has entirely different set of methods, invocations and call sequences that make the comparison to the older version impossible at a finer level of granularity. Our technique allows the user to compare two versions by adding a "component-level abstraction" at which the two can be compared. This is useful because software components themselves do not change across versions of the application (their implementation is likely to be very different, but at a higher level of abstraction, they are trying to achieve the same functionality).

Figure 4:
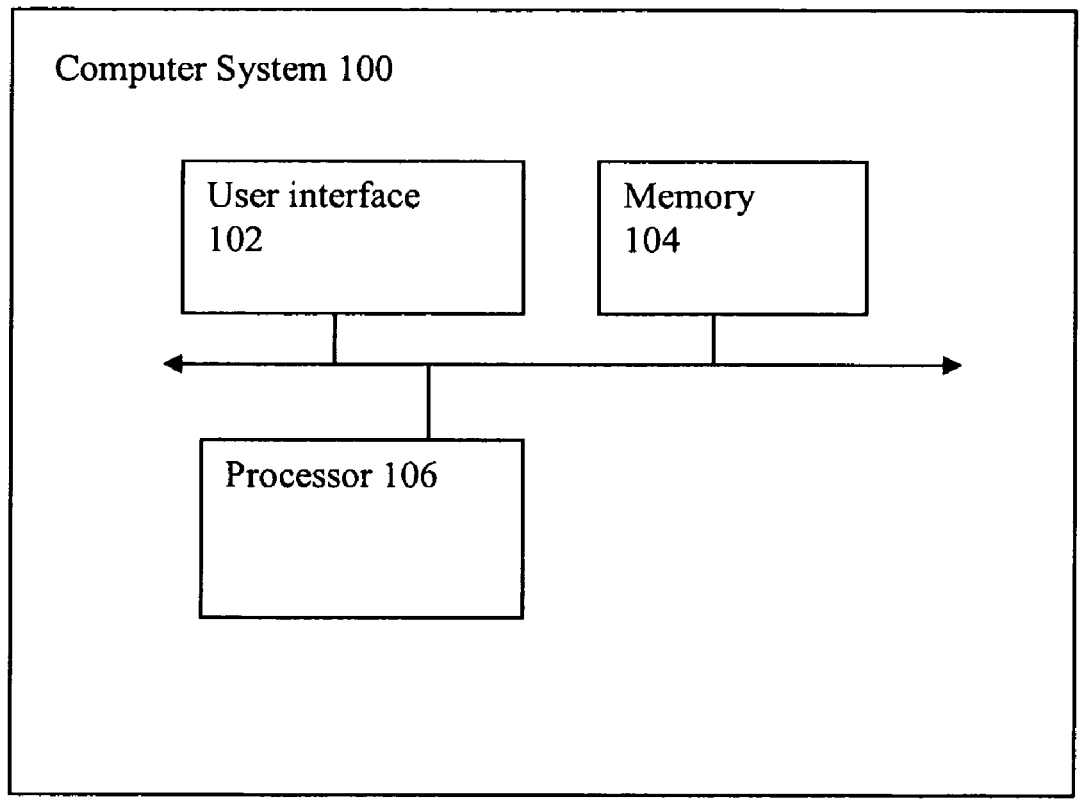
FIG. 4 is a block diagram of a computer system adapted to perform as a tool for summarizing application performance according to the invention.

Referring to FIG. 4 there is shown a block diagram of a computer system 100 adapted to perform as a tool for summarizing application performance according to the invention and to show summarization of the performance of an application. The system 100 comprises a user interface 102 for receiving the inputs identified above. The system 100 also includes a memory 104 to store the inputs and a processor 106 configured to perform a process wherein a combination of filtering and thresholding is used to summarize performance of the application.

Therefore, while there has been described what is presently considered to be the preferred embodiment, it will be understood by those skilled in the art that other modifications can be made within the spirit of the invention.

We claim:

1. A process of analyzing performance of a computer program comprising a plurality of components, the program being executable by carrying out a plurality of calling sequences, each calling sequence comprising a plurality of invocations of the methods, the process comprising steps of:
   using an interface device configured to receive:
      a call tree profile comprising a plurality of subtrees representing components, wherein each component comprises a plurality of leaf nodes, each leaf node representing an invocation within said leaf node's parent component, and each node being annotated with a cumulative performance cost for the invocation;
      at least one component from the call tree profile that is of interest to a user from a performance tuning perspective; and
      a threshold level of a cumulative performance cost associated with the invocations of the at least one component that constitutes an expensive method invocation; and
   using a processor device to compute a set of expensive method invocations of interest using a combination of filtering and thresholding, wherein said computing step comprises steps of:
      analyzing the call tree profile for performance hotspot invocations in components of interest and from a perspective of the leaf nodes, wherein the performance hotspots are identified based on a user-defined threshold value, the analyzing step comprising:
         assigning performance blame to individual components;
         using a threshold value that reduces a number of invocations within a component that are responsible for an overall cost of the component;
         selecting the nodes pertaining to the at least one component of interest to the user;
         comparing the cost of each of the selected nodes to the threshold value;
         computing a segmented cumulative cost for each invocation, wherein the segmented cumulative cost comprises rolled up costs of the invocation's callee that were identified as uninteresting minus a cost of callees that were identified as interesting;
         selecting from the selected nodes only the invocations whose segmented cumulative cost exceeds the threshold level to produce the set of expensive method invocations of interest;
      pruning a set of non-selected invocations from the call tree profile;
      performing a components-based breakdown of the performance of the computer program;
      reducing a number of invocations and
      presenting to the user a list of costs associated with only the selected invocations.

2. The process of claim 1, wherein the step of analyzing the call tree profile comprises,
   for any given component, isolating the nodes in the set of expensive method invocations of interest; and
   placing the isolated nodes in one or more component buckets.

3. The process of claim 2, wherein the step of analyzing the call tree profile comprises iterably identifying leafs in the call tree profile by finding the isolated nodes whose descendants are not assigned to any of the component buckets, wherein an isolated node is a colored leaf when it is either a leaf node of the call tree or it is not a leaf node and none of its descendants are in the set of expensive invocation methods of interest.

4. The process of claim 3, wherein the step of analyzing the call tree profile comprises performing a plurality of iterations of the step of claim 4 wherein the last iteration comprises looking at only a root of the call tree and when it is a colored leaf node identifying it as such.

5. The process of claim 4, wherein the cumulative costs for each colored leaf in each component bucket are calculated, and attributed to the component providing a breakdown of application performance by software components that are deemed useful by the user.

6. The process of claim 5, wherein a component breakdown per version of the application is compared with a different version of the application, to capture performance differences between versions of applications, even when the versions of the applications do not share the same invocations or methods for analyzing performance regressions between versions, and for assigning blame to specific components within the application.

7. A computer-readable storage medium comprising computer code for performing a process of analyzing performance of a computer program comprising a plurality of components, the program being executable by carrying out a plurality of calling sequences, each calling sequence comprising a plurality of invocations of the methods, the process comprising steps of:
   using an interface device configured to receive:
      a call tree profile having a plurality of nodes representing invocations, each node being annotated with a cumulative performance cost for the node;
      a set of one or more components of interest to a user from a performance tuning perspective; and
      a threshold level of a cumulative performance cost associated with invocations of methods of the components of interest that constitutes an expensive method invocation;
   analyzing the call tree profile for performance hotspot invocations in components of interest and from the leaf nodes, the analyzing step comprising:
      assigning performance blame to individual components;
      using a threshold value that reduces a number of invocations within a component that are responsible for an overall cost of the component;

selecting the nodes pertaining to the set of one or more components of interest to the user;
comparing the performance cost of each of the selected nodes to the threshold value;
computing a segmented cumulative cost for each invocation, wherein the segmented cumulative cost comprises rolled up costs of the invocation's callees that were identified as uninteresting minus a cost of callees that were identified as interesting;
selecting from the selected nodes only the invocations whose segmented cumulative costs exceeds the threshold level to produce a set of expensive method invocations of interest; and
pruning the invocations that are not selected;
performing a components-based breakdown of the performance of the computer program; and
presenting to the user a list of costs associated with the selected invocations.

8. The storage medium of claim 7, wherein the step of selecting only invocations that exceed the threshold level comprises computing a segmented cumulative cost for each invocation, where the segmented cumulative cost includes rolled up costs of the invocation's callees that were identified as uninteresting minus a cost of invocation callees that were identified as interesting, resulting in elimination of wrapper functions from the segmented cumulative cost when they call other application functions that perform all of the invocations.

9. The storage medium of claim 7, wherein the step of analyzing the call tree profile comprises, for any given component, coloring the nodes that are of interest and that meet the cost threshold and placing the colored nodes that are of interest and meet the threshold level set of nodes in one or more component buckets.

10. The storage medium of claim 7, wherein the step of analyzing the call tree profile comprises iterably identifying colored leafs in the call tree profile by finding colored nodes in the tree whose descendants do not belong to a set of colored nodes in any of the component buckets, wherein a colored node is a colored leaf when it is either a leaf node of the call tree or it is not a leaf node and none of its descendants are in the set of colored nodes.

11. A tool for performing a method of analyzing performance of a computer program comprising a plurality of components, the program being executable by carrying out a plurality of calling sequences, each calling sequence comprising a plurality of invocations of the methods, the tool comprising:
a user interface configured to receive:
an indication from a user that one or more components are of interest to the user from a performance tuning perspective;
a call tree profile comprising a plurality of nodes representing invocations, each node being annotated with a cumulative performance cost for the node; and
wherein the user interface is further configured for presenting to the user a list of costs associated with selected invocations;
a threshold level of the cumulative performance cost associated with invocations of methods of the component of interest that constitutes an expensive method invocation;
a processor configured to analyze the call tree profile for performance hotspot invocations in components of interest and from leaf nodes, the analysis comprising:
assigning performance blame to individual components;
using a threshold value that reduces a number of invocations within a component that are responsible for an overall cost of the component;
selecting from the call tree profile the nodes pertaining to the one or more components of interest to the user;
comparing the performance cost of each of the selected nodes to the threshold value;
computing a segmented cumulative cost for each invocation, wherein the segmented cumulative cost comprises rolled up costs of the invocation's callees that were identified as uninteresting minus a cost of callees that were identified as interesting;
selecting only the invocations whose segmented cumulative costs exceeds the threshold level;
pruning a set of invocations that are not selected; and
performing a components-based breakdown of the performance of the computer program.

12. A method of analyzing the performance of a computer program formed of a plurality of components, said program being executable by carrying out a plurality of calling sequences, each calling sequence comprising a plurality of invocations of said plurality of methods, said method comprising:
using a processor device configured to perform:
computing a set of expensive method invocations of interest using a combination of filtering and thresholding, comprising steps of:
assigning performance blame to individual components;
using a threshold value that reduces a number of invocations within a component that are responsible for an overall cost of the component;
selecting a first component that is of interest to a user from a performance tuning perspective;
defining a threshold level of a performance cost associated with invocations of methods of the first component;
measuring a cumulative performance cost for all invocations of all methods of the first component in each calling sequence;
comparing the cumulative performance cost of all the invocations of the first component to the threshold level;
computing a segmented cumulative cost for each invocation, of the first component, wherein the segmented cumulative cost comprises rolled up costs of the invocation's callees that were identified as uninteresting minus a cost of callees that were identified as interesting;
selecting only the invocations whose segmented cumulative cost exceeds the threshold level to produce a set of expensive method invocations of interest;
performing a components-based breakdown of the performance of the computer program; and
presenting to the user the set of expensive method invocations of interest.

* * * * *